(12) United States Patent
Schreiber et al.

(10) Patent No.: US 11,919,431 B2
(45) Date of Patent: Mar. 5, 2024

(54) SYSTEM FOR AND METHOD OF PROVIDING AN OPENING FOR RECEIVING A SHIPMENT IN A LOADING SPACE OF A VEHICLE

(71) Applicants: HYUNDAI MOTOR COMPANY, Seoul (KR); KIA MOTORS CORPORATION, Seoul (KR)

(72) Inventors: Michael Schreiber, Frankfurt am Main (DE); Ingmar Langer, Darmstadt (DE)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 1120 days.

(21) Appl. No.: 16/709,595

(22) Filed: Dec. 10, 2019

(65) Prior Publication Data

US 2021/0078478 A1 Mar. 18, 2021

(30) Foreign Application Priority Data

Sep. 16, 2019 (DE) .......................... 102019214072.6

(51) Int. Cl.
| | | |
|---|---|---|
| *B60P 1/44* | (2006.01) | |
| *B60P 1/26* | (2006.01) | |
| *B62D 33/027* | (2006.01) | |
| *G06Q 10/083* | (2023.01) | |
| *G06Q 50/28* | (2012.01) | |
| *G06T 7/62* | (2017.01) | |

(52) U.S. Cl.
CPC ............... *B60P 1/4407* (2013.01); *B60P 1/26* (2013.01); *B60P 1/4478* (2013.01); *B62D 33/027* (2013.01); *G06Q 10/083* (2013.01); *G06Q 50/28* (2013.01); *G06T 7/62* (2017.01)

(58) Field of Classification Search
CPC ......... B60P 1/4407; B60P 1/26; B60P 1/4478; G06T 7/62; B62D 33/027; G06Q 10/083; G06Q 50/28
See application file for complete search history.

(56) References Cited

U.S. PATENT DOCUMENTS

| | | | |
|---|---|---|---|
| 10,556,334 B1* | 2/2020 | Theobald | B25J 9/1679 |
| 11,030,569 B2* | 6/2021 | Oz | G06Q 30/0611 |
| 11,035,166 B2* | 6/2021 | Demele | E05F 15/652 |
| 2017/0091710 A1* | 3/2017 | Van Dyke | G06Q 10/0835 |
| 2018/0075681 A1* | 3/2018 | Scalisi | G06K 7/10366 |
| 2019/0161190 A1* | 5/2019 | Gil | B65G 1/0435 |
| 2019/0279154 A1* | 9/2019 | Nakajima | H04W 12/06 |
| 2020/0027054 A1* | 1/2020 | Hall | G06Q 10/083 |
| 2020/0286033 A1* | 9/2020 | Ur | G08G 5/0034 |

* cited by examiner

*Primary Examiner* — Hussein Elchanti
(74) *Attorney, Agent, or Firm* — Lempia Summerfield Katz LLC

(57) ABSTRACT

A system and a method for providing an opening for delivering a shipment into a loading space of a vehicle, as well as a corresponding vehicle and a method for delivering a shipment into a vehicle, include a controller arranged and configured to calculate a first length of the opening based on received and/or determined dimensions of the shipment and further based on an area of the opening configured to receive the shipment through the opening in the loading space of the vehicle. An actuator is arranged and configured to move a first element of the vehicle relative to a second element of the vehicle by the calculated first length of the opening in order to provide the exactly necessary opening.

15 Claims, 5 Drawing Sheets

SYSTEM FOR AND METHOD OF PROVIDING AN OPENING FOR RECEIVING A SHIPMENT IN A LOADING SPACE OF A VEHICLE

CROSS REFERENCE TO RELATED APPLICATION

The present application claims priority to and the benefit of German Patent Application No. 102019214072.6, filed Sep. 16, 2019, the entire contents of which are incorporated herein for all purposes and in its entirety by this reference.

TECHNICAL FIELD

The present disclosure is related to a system for and a method for providing an opening for receiving a shipment in a loading space of a vehicle, a corresponding vehicle, and a method for delivering a shipment into a vehicle.

BACKGROUND

Many purchases are nowadays conducted on online platforms of dealers/vendors via the internet, in particular e-commerce. A purchaser buys one or more goods and a shipping company or the post delivers the goods from the dealer/vendor to the purchaser (regularly after payment). Most people are not at home at daytime during the week due to their job or other duties. Thus, packages containing the goods purchased online, and other packages or registered/ certified letters, which require personal receipt (generally denoted as "shipments" hereinafter), cannot be delivered directly to the recipient, e.g. the purchaser. Instead, the shipments are intermediately stored at a post office or office of the shipping company. The recipient has to fetch the shipments from said office in person.

For delivering such shipments to a purchaser's vehicle, accessing the trunk of the vehicle via the tailgate or even accessing the passenger compartment via the door poses a significant security risk. An unknown person from a logistics company, e.g. delivery man, may have access to a private car. Thus, the recipient has to rely on the credibility of said person and the logistics company to ensure that the access is not abused, e.g. car theft, and also that the car is closed and locked properly after the shipment has been placed inside the car.

SUMMARY

Given this background, there is a need to improve security in delivering shipments into loading spaces of vehicles.

It is an object of the present disclosure to avoid or at least alleviate the security risk connected with delivery of shipments into loading spaces of vehicles. The present disclosure provides a system for providing an opening for receiving a shipment in a loading space of a vehicle. The present disclosure also provides a corresponding vehicle and a method for providing an opening for receiving a shipment in a loading space of the vehicle and delivering the shipment into the vehicle. Further refinements and advantageous embodiments of the present disclosure are described herein.

According to a first aspect of the present disclosure, a system for providing an opening for receiving a shipment in a loading space of a vehicle comprises a receiver and alternatively or additionally a determination unit. The system further comprises a controller and an actuator. The receiver is arranged and configured to receive dimensions of the shipment. The determination unit is arranged and configured to determine the dimensions of the shipment. The controller is communicatively connected with the receiver and/or with the determination unit. The controller is arranged and configured to calculate a first length of the opening based on the received dimensions and alternatively or additionally based on the determined dimensions of the shipment and further based on an area of the opening configured to receive the shipment through the opening in the loading space of the vehicle. The actuator is communicatively connected with the controller. The actuator is arranged and configured to move a first element of the vehicle relative to a second element of the vehicle by the calculated first length of the opening in order to provide the opening.

According to a second aspect of the present disclosure, a vehicle comprises the actuator of the system according to the first aspect of the present disclosure, a first element and a second element. The first element is movable relative to the second element. The first element is arranged and configured to be moved relative to the second element by the actuator of the system by the calculated first length of the opening in order to provide the opening.

According to a third aspect of the present disclosure, a method for providing an opening for delivering a shipment into a loading space of a vehicle comprises the steps:
  a1) receiving dimensions of the shipment; and additionally or alternatively;
  a2) determining the dimensions of the shipment;
  b) calculating a first length of the opening based on the received dimensions and additionally or alternatively based on the determined dimensions of the shipment and further based on an area of the opening configured to receive the shipment through the opening in the loading space of the vehicle; and
  c) moving a first element of the vehicle relative to a second element of the vehicle by the calculated first length of the opening in order to provide the opening.

According to a fourth aspect of the present disclosure, a method for delivering a shipment into a vehicle comprises the steps:
  A) initiating delivering of the shipment into a loading space of the vehicle;
  B) delivering the shipment to a vicinity of the vehicle;
  C) providing an opening for delivering the shipment into the loading space of the vehicle by the method according to the third aspect of the present disclosure;
  D) checking whether the shipment was placed into the loading space of the vehicle via the provided opening; and
  E) closing the opening when the shipment was placed into the loading space of the vehicle.

The method according to the third aspect of the present disclosure implements all steps executed by the system according to the first aspect of the present disclosure. The description and explanation relating to the system or the vehicle apply also to the method according to the third aspect of the present disclosure and also to the method according to the fourth aspect of the present disclosure and vice versa.

The steps of the methods according to the third and the fourth aspects of the present disclosure may be executed in a different order and/or at least partially concurrently. Steps a) to c) or a) to e) (see further below) of the method according to the third aspect of the present disclosure are included in step C) of the method according to the fourth aspect of the present disclosure. In an embodiment, these steps may be at least partially executed before, during and/or after the steps A), B), D) and E) of the method according to the fourth aspect of the present disclosure.

One idea of the present disclosure is to improve security in delivering a shipment to a loading space of a vehicle by calculating a size of the opening, through which the shipment is delivered into the loading space. Thereby, the size of the opening fits the dimensions of the shipment.

Any communicative connection between two components or any interface of a component of the present disclosure may be based on a standardised communication protocol. The communicative connection/interface may be wireless or tethered. For example, the communicative connection/interface may be based on USB, Firewire, LAN, CAN bus, WLAN/Wi-Fi, mobile network (LTE, UMTS, etc.), Bluetooth, ZigBee, RFID, QR code, Bar code, and the like.

It is understood that the terms "vehicle," "vehicular," or other similar terms as used herein include motor vehicles in general such as passenger automobiles including sports utility vehicles (SUV), buses, trucks, various commercial vehicles, and the like. The terms include not only diesel vehicles but also vehicles running on petrol or other fuels. The examples include hydrogen-powered vehicles, other alternative fuels-powered vehicles, e.g., fuels derived from resources other than petroleum), as well as hybrid vehicles. As referred to herein, a hybrid vehicle is a vehicle that has two or more sources of power, for example, vehicles that are both gasoline-powered and electric-powered. The vehicle may be a car-like, for example a sedan, a van, a hatchback, a cabriolet, etc.

The loading space of the vehicle may be a passenger cabin of the vehicle, a trunk of the vehicle, the inside of a top box mounted on the vehicle or the like.

The receiver is used for receiving the dimensions of the shipment. The receiver can be any device having an interface for establishing a communicative connection to another device or system, which can provide the dimensions of the shipment, as well as to the controller. For example, a server or a storage at a dealer/vendor side and/or at a shipping company side may store the dimensions of the shipment, e.g. the length, height and width of a (cuboid) package. The server or the storage may provide the dimensions of the shipment to the receiver via the communicative connection or the interface. The receiver may be included in the vehicle, for example a Bluetooth receiver may be aligned near a windscreen of the vehicle inside the vehicle. A delivery man of a shipping company (shipping company side) may send the dimensions of the shipment to be delivered into the loading space of the vehicle from a mobile device via Bluetooth to the Bluetooth receiver of the vehicle. Alternatively, the dimensions of the shipment may be provided, for example, via a mobile network from a server of a dealer/vendor (dealer/vendor side) to the receiver of the vehicle. The dimensions of the shipment may also be provided in the form of a QR-code or bar-code attached on the shipment. The receiver of the vehicle may be a QR-code scanner or bar-code scanner arranged and configured to read the dimensions of the shipment from the corresponding QR-code or bar-code on the shipment, e.g. through the windscreen, a side window or a rear window of the vehicle. In another example, the receiver may be located at the dealer/vendor side, the shipping company side or a vehicle manufacturer side, e.g. a control center. The receiver is communicatively connected with the controller. After receiving the dimensions of the shipment, e.g. from the dealer/vendor side or the shipping company side, the receiver transmits the dimensions of the shipment to the controller via any of the above-mentioned interfaces or communicative connections.

The determination unit may be any device configured to determine the dimensions of the shipment. The determination unit is communicatively connected with the controller. When the dimensions of the shipment are not provided by the dealer/vendor, the determination unit can be used to determine the dimensions of the shipment. For example, the determination unit may be included in the vehicle. When the delivery man arrives at the vehicle into whose loading space the shipment is to be delivered, the dimensions can be determined by the determination unit of the vehicle and transmitted to the controller.

The controller may be a data processing equipment or implemented as part of a data processing equipment. A data processing equipment may be a microcontroller (μC), an integrated circuit (IC), an Application-Specific Integrated Circuit (ASIC), an Application-Specific Standard Product (ASSP), a Digital Signal Processor (DSP), a Field Programmable Gate Array (FPGA) and the like. The controller can be located on the dealer/vendor side or the shipping company side or the vehicle manufacturer (control center) side or be included in the vehicle. The controller is communicatively connected with the receiver and additionally or alternatively to the determination unit. The controller is used for calculating the first length of the opening.

For calculating the first length of the opening, the dimensions of the shipment are compared to an area of the opening configured to receive the shipment through the opening in the loading space of the vehicle. The area of the opening is configured to receive the shipment through the opening in the loading space of the vehicle when the area of the opening has such a size that the shipment can be put through the opening into the loading space of the vehicle without getting stuck in the opening. In an embodiment, the opening may be configured such that further things (like a tool or a human arm), other than the shipment, cannot pass or be put through the opening. Thereby, a further access to the vehicle cannot be easily enforced.

The area of the opening may be defined by the first length of the opening and a predefined second length of the opening. The predefined second length of the opening may be fixed, e.g. a width of a window frame of the vehicle. The first length of the opening is variable, e.g. a position of an automated window of the vehicle guided in the window frame. In that case, the closed position corresponds to a first length of value 0. The area of the opening is thus adjusted by changing the first length of the opening. Thereby, the area of the opening is adjusted such that the shipment can be passed through the opening into the loading space of the vehicle. For example, a first dimension of the shipment, e.g. height of the package, may be used to calculate the first length of the opening by setting the first length of the opening equal to the first dimension of the shipment. In that case, the shipment fits through the opening having the first length equal to the first dimension of the shipment (when a second dimension of the shipment is equal to or smaller than the second length of the opening). In an embodiment, nothing other than the shipment can pass through the opening.

The first element and the second element are included in the vehicle. The opening may be provided between the first element and the second element or in the second element by the first element. The first element is moved by the actuator relative to the second element. The moving of the first element relative to the second element may be a linear moving, a rotating, a tilting, a moving along one or more directions and/or a rotating about one or more rotation axes. Thereby, the first element may be positioned in a closed position, where there is no opening between the first element and the second element or in the second element. The first element may be moved to an (completely) open position, where there is an opening between the first element and the second element or in the second element by the first element. The first element may be movable whereas the second element may be fixed. Further, the first element may be guided at and additionally or alternatively by the second element. For example, the first element may be an automatically movable window of the vehicle and the second element may be a window frame of the vehicle, e.g. a window frame at a door of the vehicle or at a tailgate of the vehicle. The automatically movable window may be automatically moved (opened/closed) by the actuator, e.g. a servo motor, a stepping motor, an electrical motor, etc. with or without gear mechanism. The window is moved along the window frame in one linear direction, e.g. from the closed position, where the window completely covers the window frame, to a partially open position, where the window is retracted from the frame and does not cover at least a portion of the window frame. The automatically movable window may be guided in the window frame and moved along the window frame by the actuator. The automatically movable window may be moved from a closed position, where the automatically movable window completely covers the window frame, to a completely open position, where the automatically movable window does not cover any portions of the window frame.

The first length of the opening can be dependent on another geometrical feature of the first element relative to the second element. For example, when the opening is provided between a rotatably hinged door and a door frame of the vehicle (e.g. formed with a body of the vehicle), the first length corresponds to a distance between an edge of the rotatably hinged door farthest from a fulcrum of the rotatably hinged door and the door frame. The distance depends on an opening angle of the rotatably hinged door relative to the door frame. The first length thus can be converted into the opening angle and vice versa via trigonometric functions (e.g. sine function).

The actuator is included in the vehicle. The actuator may be any device configured to move the first element, e.g. a movable window, of the vehicle relative to the second element, e.g. a window frame, of the vehicle. The opening is adjusted by moving the first element with the actuator by the calculated first length relative to the second element. The first element is moved by the calculated first length. Thereby, the area of the opening is adjusted to the exact size necessary for delivering the shipment (but nothing more or instead) into the loading space of the vehicle. The actuator may be mechanically connected with the first element of the vehicle. The actuator moves the first element of the vehicle by the calculated first length relative to the second element of the vehicle in order to provide the opening with the area configured to receive the shipment in the loading space of the vehicle. The actuator may be an electric motor or a drive like a servo motor, a stepping motor or a linear drive. Alternatively, the actuator may be a hydraulic drive or a pneumatic drive, e.g. for an automatic tailgate etc.

The vehicle must at least comprise the actuator of the system according to the first aspect of the present disclosure as well as the first element and the second element. With this (minimum) configuration, the actuator can receive the calculated first length of the opening from the communicatively connected (external) controller, e.g. located at the dealer/vendor side, the shipping company side, or the car manufacturer (control center) side. The actuator then moves the first element relative to the second element by the received calculated first length of the opening. Thereby, the opening is provided with the calculated first length (and predefined second length) between the first element and the second element or in the second element by the first element. Thus, the shipment (but nothing more or instead) fits through the opening and can be delivered through the opening into the loading space of the vehicle.

The vehicle may additionally comprise any or all of the further elements of the system according to the first aspect of the present disclosure.

In step A), delivering of the shipment into the loading space of the vehicle is initiated. Information about the vehicle like a (current) location and/or access rights to the vehicle may be forwarded to the delivery man, e.g. on a mobile device of the delivery man.

In step B), the shipment is delivered to a vicinity of the vehicle. This can be accomplished by the delivery man based on the location information about the vehicle contained in the forwarded information about the vehicle. The (current) location of the vehicle may be provided by the recipient, the dealer/vendor, or the vehicle itself, e.g. by a navigation system of the vehicle. It may further be checked whether the shipment has arrived at the vicinity of the vehicle before step C) or the corresponding steps of the method according to the third aspect of the disclosure are executed.

By calculating the first length of the opening and moving the first element relative to the second element according to the present disclosure, delivering a shipment into the loading space of the vehicle becomes more secure. Nothing but the shipment can be put through the provided opening into the loading space of the car. Thus, unauthorised access or abuse of provided access to the vehicle, e.g. resulting in theft, can be effectively prevented.

According to an embodiment of the present disclosure, the area comprises a predetermined second length of the opening. The predetermined second length of the opening is perpendicular to the first length of the opening.

The first length to be calculated according to the dimensions of the shipment corresponds to a first length of the area of the opening, e.g. a height by which the automatically movable window is moved (opened/closed) by the actuator. The predetermined (fixed) second length, which is perpendicular to the first length, corresponds to a second length of the area of the opening. The area of the opening is thus adjusted by changing the first length of the opening, while the second length remains constant. Thereby, the area of the opening is adjusted such that the shipment can be passed through the opening into the loading space of the vehicle.

In an embodiment, an opening with a nearly rectangular area like an opening in a trapezoid window frame of the vehicle can be provided by moving an automatically movable window of the vehicle with the actuator relative to the window frame. The opening could be approximated as an opening with a variable first length and a perpendicular predetermined second length of the area of the opening. The approximated area of the opening defined by the first length and the predetermined second length fits into the real trapezoid area of the opening. Thereby, there is no overlap or unnecessary free area between the both.

An area of the opening, defined as described above, provides a particular efficient calculation of the first length of the opening.

According to an embodiment of the present disclosure, the controller is further arranged and configured to check whether a predetermined maximal area of the opening is sufficient for the shipment to be delivered into the loading space of the vehicle through the opening based on the received dimensions and additionally or alternatively based on the determined dimensions of the shipment and based on the predetermined maximal area of the opening. Thereby, the first element is only moved by the calculated first length when the predetermined maximal area of the opening is sufficient for the shipment to be delivered into the loading space of the vehicle through the opening.

According to a further embodiment of the present disclosure, step b) comprises the sub-steps:
b2) checking whether a predetermined maximal area of the opening is sufficient for the shipment to be delivered into the loading space of the vehicle through the opening based on the received dimensions and additionally or alternatively based on the determined dimensions of the shipment and based on the predetermined maximal area of the opening.

Thereby, step c) is only executed when the predetermined maximal area of the opening is sufficient for the shipment to be delivered into the loading space of the vehicle through the opening.

The predetermined maximal area of the opening is based on the first length of the opening. The first length of the opening can be maximally set, e.g. a maximal height of the opening in the window frame of the vehicle when the automatically movable window of the vehicle is moved completely down the window frame. In that case, the complete window frame is not covered by the automatically movable window, and the predefined (fixed) second length of the opening is, for example, the width of the window frame. If the maximal area of the opening is smaller than the area of the shipment to be delivered into the loading space of the vehicle, then the check is negative and the first element is not moved by the calculated first length. Alternatively, if one of the two dimensions of a smallest side of the shipment is larger than one of the first length and the second length of the opening, then the check is negative and the first element is not moved by the calculated first length.

The checking in step b2), which is part of step C), may be executed before the steps A) and/or B). Thus, delivering is not initiated and/or the shipment is not delivered to a vicinity of the vehicle when the shipment cannot be put through the maximal area of the opening.

By checking whether the predetermined maximal area of the opening is sufficient for the shipment to be delivered into the loading space of the vehicle through the opening, an unnecessary moving of the first element can be prevented. Further, damage to the shipment and/or the vehicle could arise when a shipment is too big to be delivered into the loading space of the vehicle through the opening but is forcefully put through the opening. Such damage can be effectively prevented.

According to an embodiment of the present disclosure, the controller is further arranged and configured to determine a minimal dimension of the shipment and to set the first length of the opening equal to the determined minimal dimension of the shipment.

According to a further embodiment of the present disclosure, step b) further comprises the sub-steps:
b1) determining a minimal dimension of the shipment; and
b3) setting the first length of the opening equal to the determined minimal dimension of the shipment.

Setting the first length of the opening equal to the determined minimal dimension of the shipment provides an explicitly efficient calculation of the first length of the opening.

According to an embodiment of the present disclosure, the controller is further configured:
to determine a second to minimal dimension of the shipment linearly independent from the minimal dimension of the shipment;
to check whether the predetermined second length of the opening is equal to or greater than the determined second to minimal dimension of the shipment;
to check whether a predetermined maximal first length of the opening is equal to or greater than the determined minimal dimension of the shipment when the predetermined second length of the opening is equal to or greater than the determined second to minimal dimension of the shipment;
to set the first length of the opening equal to the determined minimal dimension of the shipment when the predetermined second length of the opening is equal to or greater than the determined minimal dimension of the shipment;
to check whether the predetermined second length of the opening is equal to or greater than the determined minimal dimension of the shipment when the predetermined second length of the opening is not equal to or greater than the determined second to minimal dimension of the shipment;
to check whether the predetermined maximal first length of the opening is equal to or greater than the determined second to minimal dimension of the shipment when the predetermined second length of the opening is equal to or greater than the determined minimal dimension of the shipment; and
to set the first length of the opening equal to the determined second to minimal dimension when the predetermined maximal first length of the opening is equal to or greater than the determined second to minimal dimension of the shipment.

According to a further embodiment of the present disclosure, sub-step b1) comprises the sub-step:
b1.1) determining a second to minimal dimension of the shipment linearly independent from the minimal dimension of the shipment; sub-step b2) comprises the sub-steps:
b2.1) checking whether the predetermined second length of the opening is equal to or greater than the determined second to minimal dimension of the shipment;
b2.2) checking whether a predetermined maximal first length of the opening is equal to or greater than the determined minimal dimension of the shipment when the predetermined second length of the opening is equal to or greater than the determined second to minimal dimension of the shipment;
b2.3) to checking whether the predetermined second length of the opening is equal to or greater than the determined minimal dimension of the shipment when the predetermined second length of the opening is not equal to or greater than the determined second to minimal dimension of the shipment; and
b2.4) checking whether the predetermined maximal first length of the opening is equal to or greater than the determined second to minimal dimension of the shipment when the predetermined second length of the opening is equal to or greater than the determined minimal dimension of the shipment; and sub-step b3) comprises the sub-steps:
- b3.1) setting the first length of the opening equal to the determined minimal dimension of the shipment when the predetermined second length of the opening is equal to or greater than the determined minimal dimension of the shipment; and
- b3.2) setting the first length of the opening equal to the determined second to minimal dimension when the predetermined maximal first length of the opening is equal to or greater than the determined second to minimal dimension of the shipment.

The embodiment of the present disclosure may comprise the steps of checking the predetermined maximal first length and the predetermined second length of the opening against the two smallest dimensions of the shipment and setting the first length correspondingly to the outcome. These steps guarantee that any shipment that can possibly fit through the opening can be delivered into the loading space of the vehicle. These steps also guarantee that, for a shipment too big to be delivered through the (maximal) opening, the opening will not be provided or the first element will not be moved because the first length of the opening will not be calculated or set.

According to an embodiment of the present disclosure, the dimensions of the shipment comprises a first main dimension, a second main dimension and a third main dimension of a cuboid representing the shipment. The second main dimension is linearly independent from the first main dimension and the third main dimension is linearly independent from the first main dimension and from the second main dimension.

The cuboid with the first, the second and the third main dimensions representing the shipment provides a particular efficient determination of the dimensions, in particular of the minimal and second to minimal dimension of the shipment.

According to an embodiment of the present disclosure, the cuboid is a virtual substitution for a real shape of the shipment and the cuboid completely surrounds the real shape of the shipment.

A shipment having a complicated shape like a frustum, a sphere, a polygon other than a cuboid or the like can be substituted with a surrogate cuboid shape, which encloses the shape of the shipment without intersection or any unnecessary free space. Additionally, a tolerance of +2%, +1% [Percent], or +0.5% can be added to the dimensions of the surrogate cuboid.

The virtual substitution of shipments for a complicated shape by cuboids provides an efficient determination of the dimensions, in particular of minimal and second to minimal dimensions even of shipments with complicated shapes.

According to an embodiment of the present disclosure, at least one of the dimensions of the shipment is extended by a predetermined tolerance.

At least one dimension of the shipment may be (virtually) extended by a predetermined tolerance of between 1% and 10%, between 3% and 7%, or about 5%.

With the provision of tolerances extending the dimensions, uncertainties and inaccuracies of the received or determined dimensions can be accounted for. This ensures that the calculated first height is sufficient for delivering the shipment into the loading space of the vehicle through the opening.

According to an embodiment of the present disclosure, the controller is further arranged and configured:
- to determine a maximal dimension of the shipment; and
- to check whether the loading space can receive the determined maximal dimension of the shipment through the opening.

Thereby, the first element is only moved by the calculated first length when the loading space can receive the determined maximal dimension of the shipment through the opening.

According to a further embodiment of the present disclosure, step b) further comprises the sub-steps:
- b4) determining a maximal dimension of the shipment; and
- b5) checking whether the loading space can receive the determined maximal dimension of the shipment through the opening.

Thereby, step c) is only executed when the loading space can receive the determined maximal dimension of the shipment through the opening.

The opening is provided only when the loading space of the vehicle can receive the whole shipment. This can effectively avoid a damage to the shipment and/or the vehicle or a continuously provided opening, through which the vehicle could be accessed by unauthorised persons.

According to an embodiment of the present disclosure, the controller is further arranged and configured to generate an error message when:
- the predetermined maximal area of the opening is not sufficient for the shipment to be delivered into the loading space of the vehicle through the opening; and/or
- the predetermined maximal first length of the opening is not equal to or greater than the determined minimal dimension of the shipment; and/or
- the predetermined second length of the opening is not equal to or greater than the determined minimal dimension of the shipment; and/or
- the predetermined maximal first length of the opening is not equal to or greater than the determined second to minimal dimension of the shipment.

According to a further embodiment of the present disclosure, the method according to the third aspect of the present disclosure further comprises the step:
- d) generating an error message when:
  - the predetermined maximal area of the opening is not sufficient for the shipment to be delivered into the loading space of the vehicle through the opening; and/or
  - the predetermined maximal first length of the opening is not equal to or greater than the determined minimal dimension of the shipment; and/or
  - the predetermined second length of the opening is not equal to or greater than the determined minimal dimension of the shipment; and/or
  - the predetermined maximal first length of the opening is not equal to or greater than the determined second to minimal dimension of the shipment.

The error message may contain the opening (e.g., a name of the opening like "right rear window" or ID), which has no sufficient area for the shipment to be delivered and/or the dimensions of the shipment together with the first length and the second length of the respective opening.

By providing an error message, each failure to calculate a first length of the opening, through which the shipment can be delivered into the loading space of the vehicle, can be indicated to a user like a delivery man or to an operator at the dealer/vendor side, the shipping company side or the vehicle manufacturer (control center) side.

According to an embodiment of the present disclosure, the controller is arranged and configured:

to calculate a first length of a further opening based on the received dimensions and/or based on the determined dimensions of the shipment and further based on an area of the further opening configured to receive the shipment through the further opening in the loading space of a further loading space of the vehicle when:

the predetermined maximal area of a previous opening is not sufficient for the shipment to be delivered into the loading space of the vehicle through the opening; and/or the predetermined maximal first length of the previous opening is not equal to or greater than the determined minimal dimension of the shipment; and/or the predetermined second length of the previous opening is not equal to or greater than the determined minimal dimension of the shipment; and/or the predetermined maximal first length of the previous opening is not equal to or greater than the determined second to minimal dimension of the shipment.

According to a further embodiment of the present disclosure, step b) can be iteratively executed for further openings when:

the predetermined maximal area of a previous opening is not sufficient for the shipment to be delivered into the loading space of the vehicle through the opening; and/or the predetermined maximal first length of the previous opening is not equal to or greater than the determined minimal dimension of the shipment; and/or the predetermined second length of the previous opening is not equal to or greater than the determined minimal dimension of the shipment; and/or the predetermined maximal first length of the previous opening is not equal to or greater than the determined second to minimal dimension of the shipment.

More than one opening can be provided at the vehicle when the vehicle includes several first elements and corresponding second elements as well as actuators for moving each of the first elements. In that case, the controller can calculate the first length of each further opening when the previous opening is not sufficient for delivering the shipment into the loading space of the vehicle. For example, when in a window frame of a front window of the vehicle, an opening with an area is not sufficient for delivering the shipment into the loading space of the vehicle (here the passenger compartment) a first length of a further opening, for example, in a window frame of a rear window can be calculated. Thereby, each of the first and the second elements configured to provide an opening for delivering a shipment can be iteratively checked. The checking is performed until an opening with a sufficient area for providing the shipment into the loading space of the vehicle is found or until no opening is left to check.

Thus, all possible openings are checked and even for bigger shipments can a sufficient (alternate) opening be provided.

According to an embodiment of the present disclosure, the controller is arranged and configured to send the generated error message to an external system when:

the predetermined maximal area of all openings is not sufficient for the shipment to be delivered into the loading space of the vehicle through the opening; and/or the predetermined maximal first length of all openings is not equal to or greater than the determined minimal dimension of the shipment; and/or the predetermined second length of all openings is not equal to or greater than the determined minimal dimension of the shipment; and/or the predetermined maximal first length of all openings is not equal to or greater than the determined second to minimal dimension of the shipment.

According to a further embodiment of the present disclosure, the method according to the third aspect of the present disclosure further comprises the step:

e) sending the generated error message to an external system when:

the predetermined maximal area of all openings is not sufficient for the shipment to be delivered into the loading space of the vehicle through the opening; and/or the predetermined maximal first length of all openings is not equal to or greater than the determined minimal dimension of the shipment; and/or the predetermined second length of all openings is not equal to or greater than the determined minimal dimension of the shipment; and/or the predetermined maximal first length of all openings is not equal to or greater than the determined second to minimal dimension of the shipment.

If no further opening can be provided, through which the shipment can be delivered into the loading space of the vehicle, then the last or all generated error messages are sent to an external system (like a mobile device of the delivery man or a server at the shipping company side and/or at the dealer/vendor side) and/or to a device of the recipient.

By immediately signalling the impossibility to deliver, the shipment into the loading space of the vehicle can be arranged fast by any of the openings. This provides alternative shipping options.

According to an embodiment of the present disclosure, the first element is a movable window of the vehicle, the second element is a door, a tailgate or a body of the vehicle, and the actuator is arranged and configured to move the movable window relative to the door, the tailgate or the body by the calculated first length of the opening in order to provide the opening. Alternatively, or additionally, the first element is a movable tailgate of the vehicle, the second element is the body of the vehicle and the actuator is arranged and configured to move the movable tailgate relative to the body by the calculated first length of the opening in order to provide the opening. Alternatively, or additionally, the first element is a movable sunroof of the vehicle, the second element is the body of the vehicle and the actuator is arranged and configured to move the movable sunroof relative to the body by the calculated first length of the opening in order to provide the opening. Alternatively or additionally, the first element is a movable door, a movable sliding door or a rotatably hinged door of the vehicle, the second element is the body of the vehicle (e.g. a door frame formed with the body of the vehicle) and the actuator is arranged and configured to move the movable door or the movable sliding door relative to the body by the calculated first length of the opening in order to provide the opening. Alternatively, or additionally, the first element is a movable convertible top of the vehicle, the second element is the body of the vehicle and the actuator is arranged and configured to move the movable convertible top relative to the body by the calculated first length of the opening in order to provide the opening. Alternatively or additionally, the first element is a movable lid of a top box of the vehicle, the second element is a bottom part of the top box and the actuator is arranged and configured to move the movable lid of the top box relative to the bottom part of the top box by the calculated first length of the opening in order to provide the opening.

When the opening is provided between the rotatably hinged door and the door frame of the vehicle, the first length relates to an opening angle of the rotatably hinged door. The first length corresponds to a distance between an edge of the rotatably hinged door farthest from a fulcrum of the rotatably hinged door and a door frame (formed with the body of the vehicle). The distance is proportional to the opening angle of the rotatably hinged door relative to the door frame. Therefore, the first length can be converted into the opening angle and vice versa via trigonometric functions (e.g. sine function).

According to an embodiment of the present disclosure, the determination unit comprises at least one of a camera system and a laser scanner system. The camera system has an image recognition functionality and is arranged and configured to recognize borders of the shipment and to derive the dimensions of the shipment based on the recognized borders. The laser scanner system is arranged and configured to measure the borders of the shipment and to derive the dimensions of the shipment based on the measured borders.

According to a further embodiment of the present disclosure, in step a2) borders of the shipment are recognized and the dimensions of the shipment are derived based on the recognized borders by a camera system with an image recognition functionality and additionally or alternatively the borders of the shipment are measured and the dimensions of the shipment are derived based on the measured borders by a laser scanner system.

In an embodiment, the dimensions of the shipment can be determined by presenting the shipment, in several different orientations, to the camera system or the laser scanner system. Thereby, the dimensions are automatically determined based on the measured borders of the presented shipment (in the different orientations).

The camera system and/or the laser scanner system can be included in the vehicle and, for example, be placed inside the vehicle behind the wind screen, a side window, or a rear window of the vehicle.

With the camera system and/or the laser scanner system, the dimensions of the shipment can be precisely determined when they were not received, e.g. from the dealer/vendor. Also, the received dimensions can be controlled/checked by the camera system and/or the laser scanner system and optionally corrected based on the determined dimensions of the shipment.

According to an embodiment of the present disclosure, the system further comprises a detection means communicatively connected with the controller and arranged and configured to detect the shipment in the loading space, wherein the controller is further arranged and configured to check whether the shipment is in the loading space, and wherein the actuator is further arranged and configured to move back the first element relative to the second element by the calculated first length of the opening in order to close the opening when the shipment is in the loading space.

According to a further embodiment of the present disclosure, the method according to the third aspect of the present disclosure further comprises the steps:

f) checking whether the shipment was placed into the loading space of the vehicle via the provided opening; and g) closing the opening by moving the first element of the vehicle relative to the second element of the vehicle back by the calculated first length when the shipment was placed into the loading space of the vehicle.

Step f) of the method according to the third aspect of the present disclosure corresponds to step D) of the method according to the fourth aspect of the present disclosure. Step g) of the method according to the third aspect of the present disclosure may correspond to step E) of the method according to the fourth aspect of the present disclosure. Alternatively, in step E) of the method according to the fourth aspect of the present disclosure, the opening may be manually closed, e.g. by the delivery man.

With the detection means, it can be checked whether the shipment was successfully placed in the loading space of the vehicle, e.g. by the delivery man. Subsequently, the provided opening can be closed such that no further access to the vehicle (by unauthorised persons) is possible.

By first checking whether the delivery of the shipment was successful and then (automatically), closing the opening, e.g. a premature closing of the opening, can be avoided. On the other hand, the security of the delivering process is increased because the access to the vehicle is restricted to the minimal necessary amount of time.

According to an embodiment of the present disclosure, the detection means comprises at least one of:
- a second camera system with an image recognition functionality arranged and configured to recognize the shipment inside the loading space; and
- a second receiver arranged and configured to receive a message from an external system acknowledging that the shipment was successfully delivered into the loading space.

According to a further embodiment of the present disclosure, in step f or step D), it is checked whether the shipment was placed into the loading space. The checking is performed by recognizing the shipment inside the loading space by means of a second camera system with an image recognition functionality. Alternatively, the checking is performed by receiving a message from the external system acknowledging that the shipment was successfully delivered into the loading space by a second receiver.

The second camera system may be positioned inside the vehicle or a top box on the vehicle such that the loading space can be monitored by the second camera system. When the shipment is placed inside the loading space, the second camera system recognizes the shipment in the loading space and the opening can subsequently be (automatically) closed.

If the second receiver receives a message acknowledging that the shipment was successfully delivered into the loading space, the opening can be (automatically) closed. The second receiver can be communicatively connected with the external system, e.g. a mobile device of the delivery man or a server on the shipping company side.

The embodiment of the present disclosure may comprise the step of checking whether the shipment was placed into the loading space by means of the second camera system or the message acknowledging that the shipment was successfully delivered into the loading space. Thus, a premature (automatic) closing of the opening can reliably be avoided.

According to an embodiment of the present disclosure, in step A), location information about the location of the vehicle is provided by a dealer/vendor system and/or a navigation system of the vehicle, while the location is determined manually or via GPS.

The location of the vehicle may be provided in advance and/or the current location of the vehicle may be provided continuously, e.g. in predefined time intervals e.g. every 5 minutes. The (current) location of the vehicle may be determined by GPS, for example, via the navigation system of the vehicle or manually provided by the recipient (and forwarded to a server at the shipping company side).

The disclosure will be explained in greater detail with reference to exemplary embodiments depicted in the drawings as appended.

BRIEF DESCRIPTION OF THE DRAWINGS

The accompanying drawings are included to provide a further understanding of the present disclosure and are incorporated in and constitute a part of this specification. The drawings illustrate the embodiments of the present disclosure and together with the description serve to explain the principles of the disclosure. Other embodiments of the present disclosure and many of the intended advantages of the present disclosure will be readily appreciated as they become better understood by reference to the following detailed description. The elements of the drawings are not necessarily to scale relative to each other. In the figures, like reference numerals denote like or functionally equivalent components, unless indicated otherwise.

Although specific embodiments are illustrated and described herein, it will be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

DETAILED DESCRIPTION OF THE EMBODIMENTS

Figure 1:
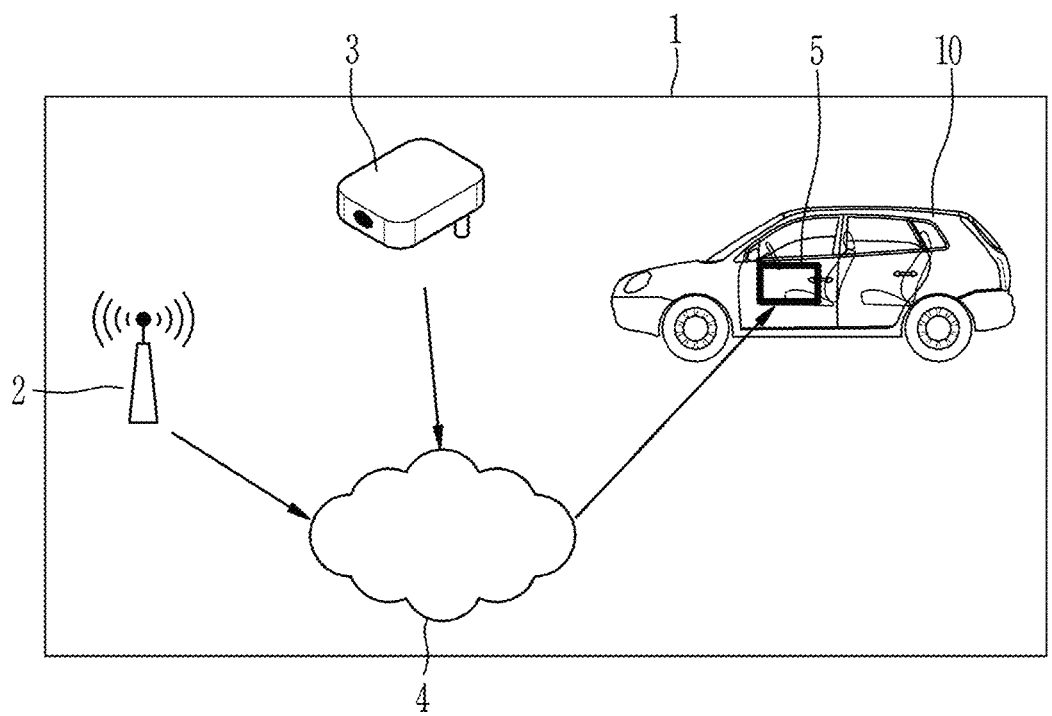
FIG. 1 shows a schematic view of the system for providing an opening for delivering a shipment into a loading space of a vehicle.

In FIG. 1, the system 1 for providing an opening for delivering a shipment into a loading space of a vehicle 10 is schematically depicted. The system 1 comprises a receiver 2 and additionally or alternatively a determination unit 3 and further a controller 4 and an actuator 5.

In this embodiment, the receiver 2 is a radio receiver. The receiver 2 may be located at the premises of a shipping company and/or at the premises of a dealer/vendor and based on WLAN or the internet. In another embodiment, the receiver 2 may be integrated into the vehicle 10 and based on Bluetooth or LTE/UMTS. The receiver 2 receives dimensions of the shipment from an external system, e.g., a system of the dealer/vendor via WLAN, the internet or LTE/UMTS or a mobile device of a delivery man via Bluetooth.

In this embodiment, the determination unit 3 is a camera system with an image recognition functionality. The determination unit 3 may be located at the premises of a shipping company and/or at the premises of a dealer/vendor. In another embodiment, the receiver 2 may be part of the vehicle 10. The determination unit 3 can determine the dimensions of the shipment based on borders of the shipment. The determination unit 3 recognizes the borders of the shipment while the shipment is presented to the determination unit 3 from different angles or in different orientations.

The controller 4 may be implemented on a cloud-based system or integrated in an electronic control unit (ECU) of the vehicle 10. The controller 4 is communicatively connected with the receiver 2 and additionally or alternatively with the determination unit 3, e.g. via a tethered (LAN, CAN bus, USB etc.) or via a wireless connection (WLAN, Bluetooth, ZigBee, etc.). The controller 4 receives the dimensions of the shipment. The controller 4 is configured to calculate an area of the opening. The area of the opening is configured to receive the shipment through the opening in the loading space of the vehicle 10. The loading space of the vehicle 10 can be a passenger cabin of the vehicle 10, a trunk of the vehicle 10, and/or an inner space of a top box mounted on the vehicle 10.

The area of the opening, which is configured to receive the shipment through the opening in the loading space of the vehicle 10, is determined such that only the shipment can be passed through the opening into the loading space of the vehicle 10. Nothing in addition to or instead of the shipment can be passed through the opening having the area, which is configured to receive the shipment through the opening in the loading space of the vehicle 10. Thus, different ways of calculating the corresponding first length h of the opening are possible.

Here, the controller 4 determines a minimal dimension of the shipment.

$$h = \min\{a,b,c\},$$

where a, b, c are the dimensions of a cuboid shaped shipment.

The controller 4 may add a tolerance or buffer of 10% to the dimensions or only to the minimal dimension of the shipment.

$$h = \min\{a,b,c\} * 1.1$$

The minimal dimension of the shipment optionally with added 10% tolerance is set as a first length h of the opening. Thus, the first length h of the opening is calculated by the controller 4 as the minimal dimension (plus 10% tolerance) of the shipment.

Because the opening has an area based on the first length h, nothing but the shipment can be put through the opening.

The actuator 5 is here exemplarily an electric motor with a gearing mechanism. The actuator 5 is included in the vehicle 10. The actuator 5 is communicatively connected with the controller 4 directly when the controller 4 is integrated in the ECU of the vehicle 10. Alternatively, the actuator 5 is communicatively connected with the controller 4 indirectly, for example, via a communication unit of the vehicle 10 when the controller 4 is implemented on a cloud-based system. The actuator 5 can move a first element of the vehicle 10 relative to a second element of the vehicle 10. The first element may be a window of the vehicle 10 and the second element may be a window frame of the vehicle. The actuator receives the first length h of the opening and moves or is controlled by the controller 4 to move the first element relative to the second element by the first length h. Thereby, the opening is provided between the first element and the second element.

The opening has the area based on the first length h. Because the first length h is calculated by the controller 4 based on the minimal dimension of the shipment, the shipment can be delivered through the opening, but nothing in addition or instead of the shipment can be put through the opening in the loading space, e.g. a passenger cabin, of the vehicle 10.

The system 1 may further comprise a detection means (not depicted), e.g., a second camera system, which can detect the shipment in the loading space of the vehicle 10.

When the detection means detects the shipment inside the loading space of the vehicle 10, the shipping is successfully delivered and the actuator 5 can be controlled by the controller 4 to close the opening by moving back the first element relative to the second element by the first length h.

Figure 2:
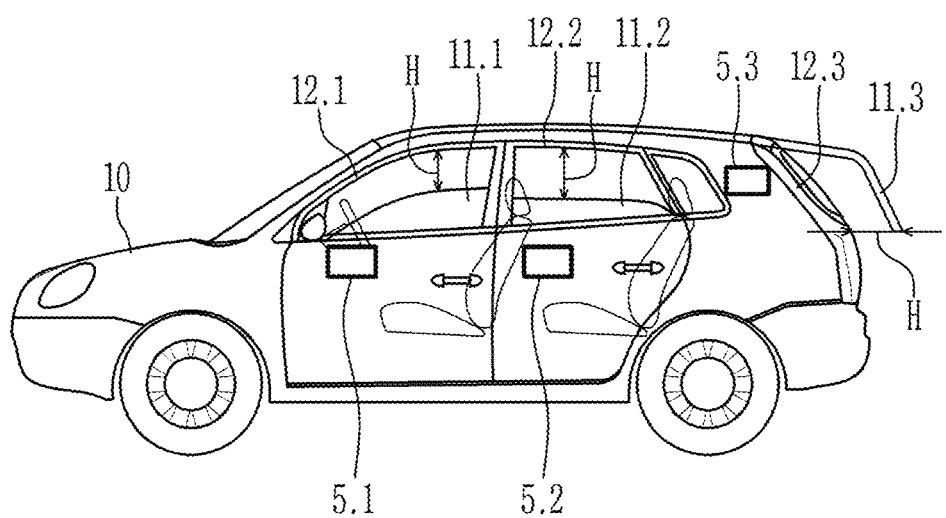
FIG. 2 shows a schematic view of the vehicle having several first elements and second elements for providing the opening.

FIG. 2 schematically depicts the vehicle 10 having several first elements 11.1 . . . 11.3 and corresponding second elements 12.1 . . . 12.3 for providing the opening.

The vehicle 10 comprises a front window as the first element 11.1, a front window frame as the second element 12.1, and an actuator 5.1 configured to move the front window 11.1 relative to the front window frame 12.1. The vehicle 10 further comprises a rear window as the first element 11.2, a rear window frame as the second element 12.2, and an actuator 5.2 configured to move the rear window 11.2 relative to the rear window frame 12.2. The vehicle 10 further comprises a tailgate as the first element 11.3, a rear body as the second element 12.3, and an actuator 5.3 configured to move the tailgate 11.3 relative to the rear body 12.3.

Upon receiving the dimensions of the shipment, the controller (not depicted), e.g. implemented on a cloud-based system, calculates the first length h of the opening as described above. The controller then controls one of the actuators 5.1 . . . 5.3 to move the respective first element 11.1 . . . 11.3 relative to the respective second element 12.1 . . . 12.3 by the calculated first length h. The controller selects the actuator 5.1 . . . 5.3 based on the dimensions of the shipment. Thus, small shipments like letters or small packages are delivered via an opening in the front window frame 12.1 by moving the front window 11.1 or via an opening in the rear window frame 12.2 by moving the rear window 11.2. When the shipment is big like a big package, which does not fit through the front window frame 12.1 or the rear window frame 12.2, the controller controls the actuator 5.3 to move the tailgate 11.3 relative to the back frame 12.3 by the calculated first length h. Thus, the big shipment can be delivered via the opening in the rear frame 12.3.

Figure 3:
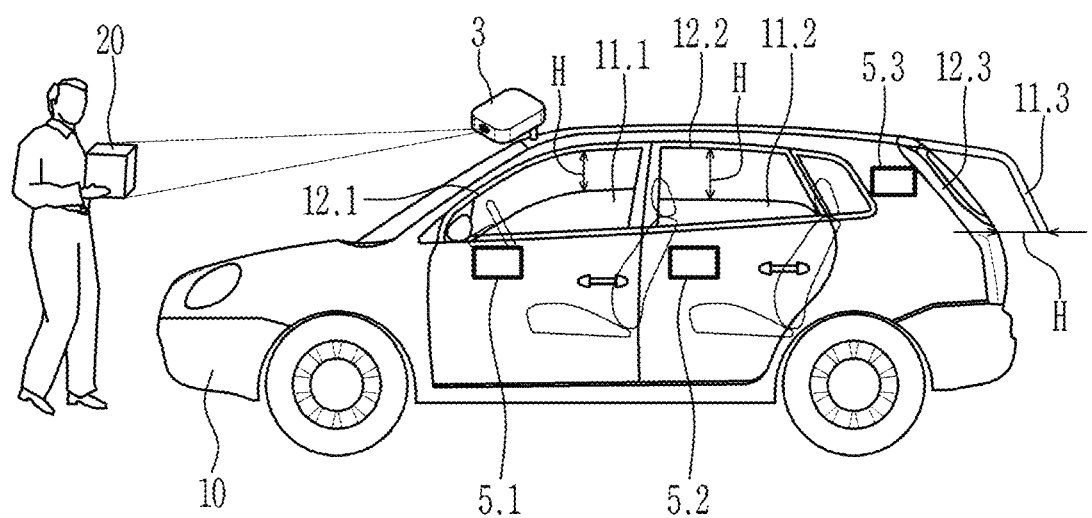
FIG. 3 shows a view of the vehicle having a determination unit.

In FIG. 3, the vehicle 10 having a determination unit 3 is schematically depicted. The vehicle 10 corresponds to the vehicle of FIG. 2.

The determination unit here is a camera system with an image recognition functionality. A delivery man presents the shipment 20 to the camera system 3 in different orientations. Thus, the camera system 3 recognizes borders of the shipment 20. From the recognized borders of the shipment 20, the camera system 3 derives the dimensions of the shipment 20. The determined dimensions of the shipment are then forwarded to the controller (not depicted). The controller calculates the first length h of the opening as described above and, in an embodiment, controls the actuator 5.1 to move the front window 11.1 relative to the front window frame 12.1 by the calculated first length h.

Figure 4:
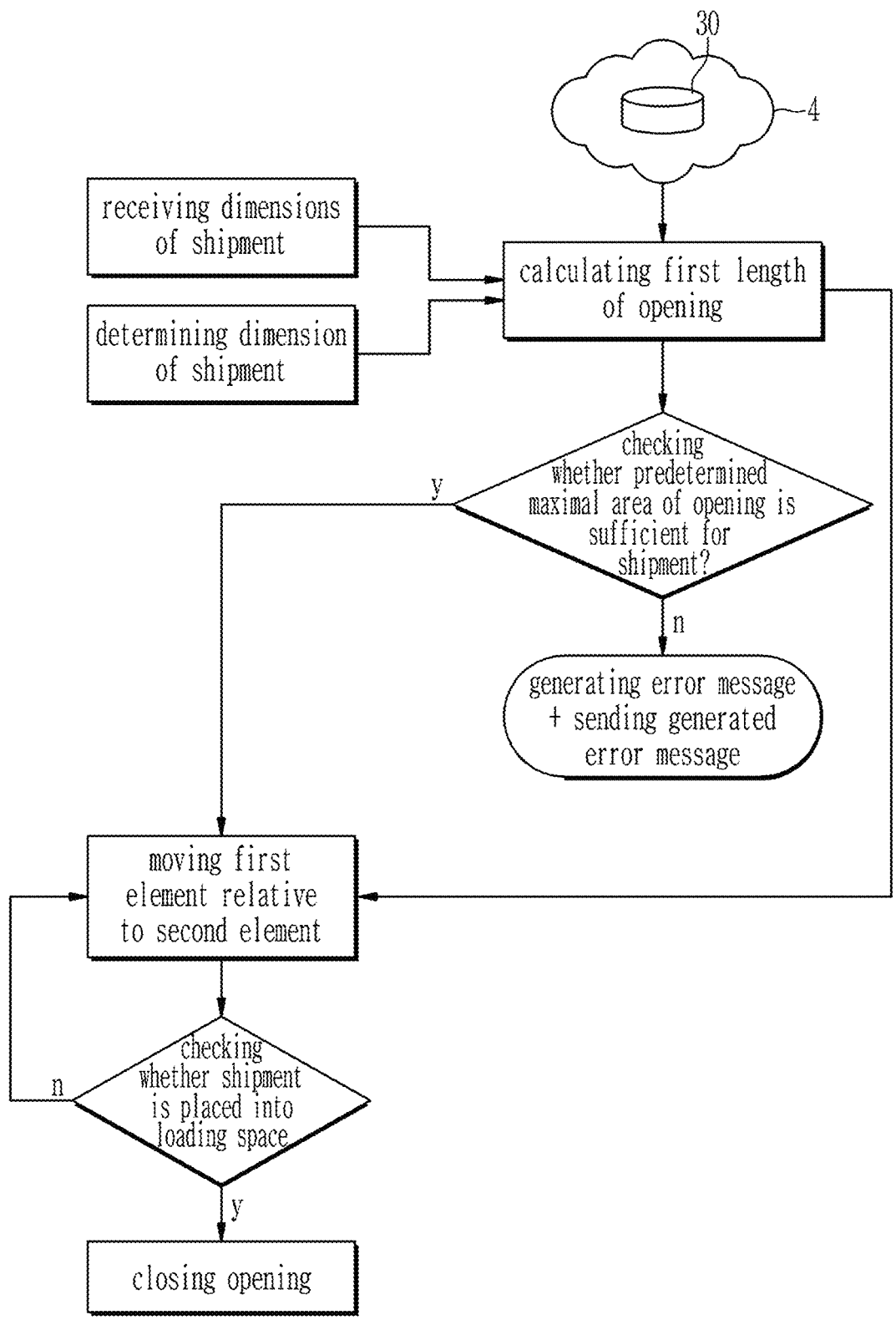
FIG. 4 shows a schematic flow chart of the method for providing an opening for delivering a shipment into a loading space of a vehicle.

In FIG. 4, the method for providing an opening for delivering a shipment into a loading space of a vehicle is schematically depicted. The method of FIG. 4 may be executed by the system of FIG. 1.

The method comprises the steps a1) receiving dimensions of the shipment and/or a2) determining the dimensions of the shipment; b) calculating a first length h of the opening; c) moving a first element of the vehicle relative to a second element of the vehicle; d) optionally generating an error message; and e) optionally sending the generated error message.

After the dimensions of the shipment have been received in step a1) and/or have been determined in step a2) as described above for the system and vehicle of FIGS. 1 to 3, the first length h of the opening is calculated in step b). The first length of the opening is calculated based on the received/determined dimensions of the shipment and further based on an area of the opening. The area of the opening is configured to receive the shipment through the opening in the loading space of the vehicle. The minimal dimension of the shipment is determined and set as the first length h of the opening as described above for the system and vehicle of FIGS. 1 to 3.

Step b) comprises a sub-step b2). In step b2), it is checked whether a predetermined maximal area of the opening is sufficient for the shipment to be delivered into the loading space of the vehicle through the opening. The checking is based on the received/determined dimensions of the shipment and on the predetermined maximal area of the opening. The predetermined maximal area of the opening may be fetched from a database 30. The database 30 may store the predetermined maximal areas of different openings for the vehicle or several different vehicles. The database 30 may be part of the controller 4. The controller 4 may be implemented on a cloud-based system at the dealer/vendor side or at the shipping company side or in the ECU of the vehicle. The predetermined maximal area of the opening is based on a maximal first length $h_{max}$ of the opening and a predefined (fixed) second length of the opening.

If the checking in step b2) is positive (y), then in step c), a first element of the vehicle, e.g. window, is moved relative to a second element, e.g. window frame, of the vehicle by the calculated first length h in order to provide the opening.

If the checking in step b2) is negative (n), then the step c) is not executed. Optionally, if the checking in step b2) is negative (n), then step d) may be executed. In step d), an error message is generated. The error message comprises an ID or name of the opening, which has no sufficient area for the shipment to be delivered.

Further, if the checking in step b2) is negative (n), then the step e) is optionally executed. In step e), the generated error message is sent to an external system, in this embodiment, a server of the shipping company. The shipping company can provide an alternative delivering option based on the error message.

After step c) has been executed, step f) is executed. In step f), it is checked whether the shipment was placed into the loading space of the vehicle via the provided opening. This may be checked by a second camera system with an image recognition functionality. The second camera system is arranged and configured to recognize the shipment inside the loading space. Additionally, or alternatively, this may be checked by a second receiver configured to receive a message from an external system, e.g. mobile device of the delivery man, acknowledging that the shipment was successfully delivered into the loading space.

If step f) is negative (n), step f) is executed again, until the checking is positive (y). When step f) is positive (y), step g) is executed. In step g), the opening is closed by moving the first element, e.g. window, of the vehicle relative to the second element, e.g. window frame, of the vehicle back by the calculated first length when the shipment was placed into the loading space of the vehicle. The first element may be moved back by the actuator of the system of FIG. 1.

Figure 5:
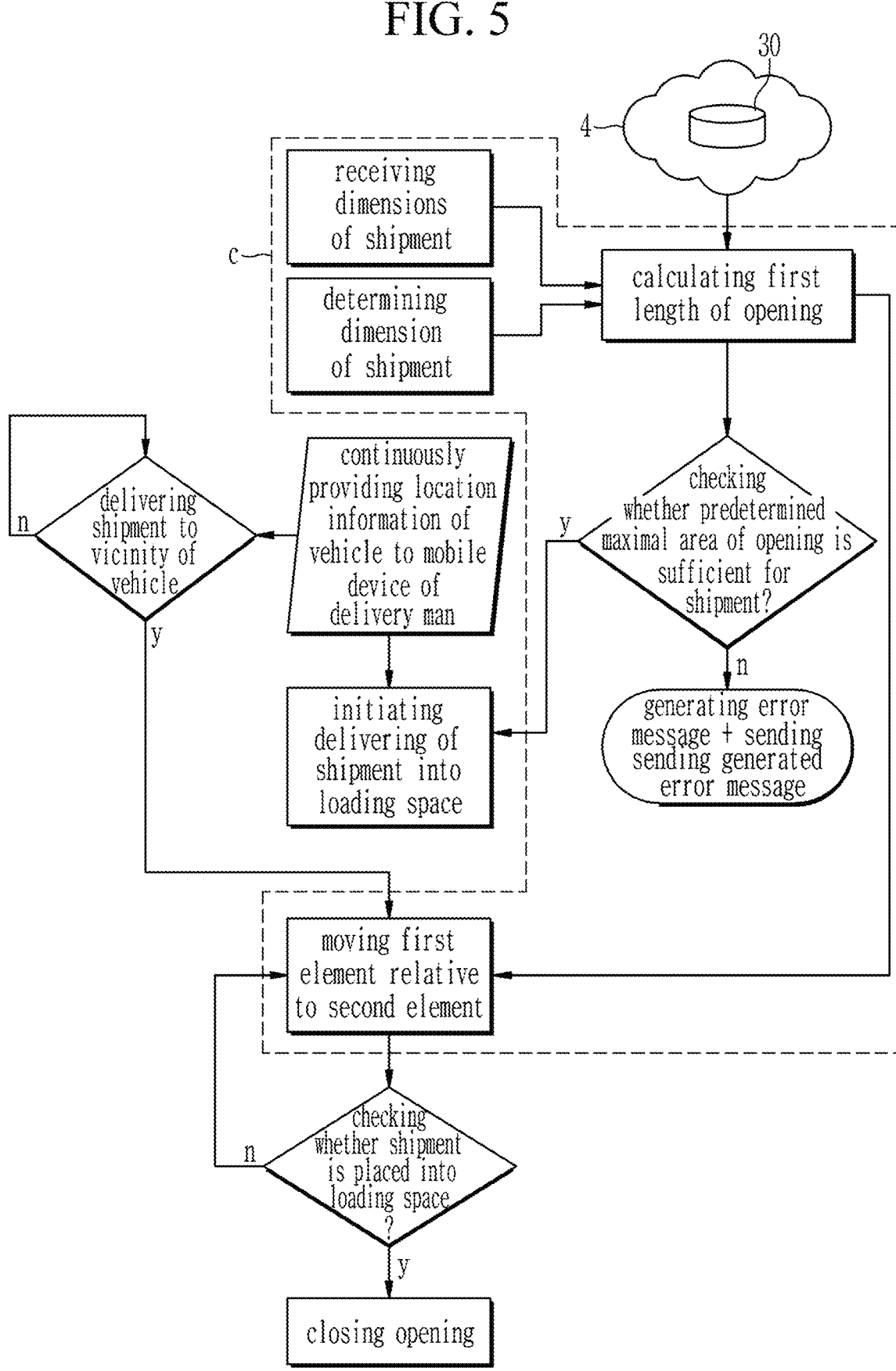
FIG. 5 shows a schematic flow chart of the method for delivering a shipment into a vehicle.

In FIG. 5, the method for delivering a shipment into a vehicle is schematically depicted. The method for delivering a shipment into a vehicle comprises the steps of the method for providing an opening for delivering a shipment into a loading space of a vehicle of FIG. 4. Therefore, only the differences to the method for FIG. 4 are described in the following.

The method for delivering a shipment into a vehicle comprises the steps: A) initiating delivering of the shipment; B) delivering the shipment to a vicinity of the vehicle; C) providing an opening; D) checking whether the shipment was placed into the loading space of the vehicle and E) closing the opening.

Step C) comprises the steps a1) and/or a2), as well as b), b2), c), d) and e) of the method of FIG. 4. Step D) corresponds to step f) of the method of FIG. 4. Step E) corresponds to step g) of the method of FIG. 4.

After steps a1) and/or a2), as well as b) and b2), have been executed and step b2) was positive (y), step A) is executed. In step A), delivering of the shipment into the loading space of the vehicle is initiated. Information about the vehicle are forwarded to the delivery man, e.g. to the mobile device of the delivery man. The information about the vehicle comprises location information and access rights to the vehicle. The location information of the vehicle is provided by a navigation system of the vehicle via GPS. In step A1), which is a sub-step of A), the location information of the vehicle is continuously provided to the mobile device of the delivery man at predefined time intervals of 5 minutes. Thus, the delivery man has the current location of the vehicle available.

In step B), the shipment is delivered to a vicinity of the vehicle. This can be accomplished by the delivery man based on the current location information about the vehicle. It is continuously checked in step B) whether the shipment has arrived at the vicinity of the vehicle.

The checking in step B) is repeated as long as the result is negative (n). Step C) (comprising the steps a1) and/or a2) as well as b), b2), c), d) and e) of the method of FIG. 4) is executed if the checking in step B) is positive (y).

After step c) of the method of FIG. 4) included in step C) has been executed, step D) is executed. If step D) is positive (y), step E) is executed.

After step E) has been executed, the delivering of the shipment into the loading space of the vehicle is successfully completed.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one having ordinary skill in the art upon reviewing the above specification.

The embodiments were chosen and described in order to explain the principles of the disclosure and its practical applications. The embodiments thereby enable others of ordinary skill in the art to utilize the disclosure and various embodiments with various modifications as are suited to the particular use contemplated. Many other examples will be apparent to one of ordinary skill in the art upon reviewing the above specification.

REFERENCE LIST

1 system for providing an opening for delivering a shipment into a loading space of a vehicle
2 receiver
3 determination unit
4 controller
5 actuator
10 vehicle
11 first elements
12 second elements
20 shipment
30 database
h first length

The invention claimed is:

1. A system for providing an opening for receiving a shipment in a loading space of a vehicle, the system comprising:
   a receiver arranged and configured to receive dimensions of the shipment; and/or
   a determination unit, comprising at least one of a camera system and a laser scanner system, arranged and configured to determine the dimensions of the shipment;
   a controller communicatively connected with the receiver and/or with the determination unit, wherein the controller is arranged and configured to calculate a first length of the opening based on the received dimensions and/or based on the determined dimensions of the shipment and further based on an area of the opening configured to receive the shipment through the opening in the loading space of the vehicle; and
   an actuator communicatively connected with the controller, wherein the actuator is arranged and configured to move a first element of the vehicle relative to a second element of the vehicle by the calculated first length of the opening in order to provide the opening,
   wherein the area comprises a predetermined second length of the opening, and wherein the predetermined second length of the opening is perpendicular to the first length of the opening,
   wherein the controller is further arranged and configured to check whether a predetermined maximal area of the opening is sufficient for the shipment to be delivered into the loading space of the vehicle through the opening based on the received dimensions and/or based on the determined dimensions of the shipment and based on the predetermined maximal area of the opening, and wherein the first element is moved by the calculated first length of the opening when the predetermined maximal area of the opening is sufficient for the shipment to be delivered into the loading space of the vehicle through the opening,
   wherein the controller is further arranged and configured to determine a minimal dimension of the shipment and to set the first length of the opening equal to the determined minimal dimension of the shipment, and
   wherein the controller is further arranged and configured to determine a second to minimal dimension of the shipment linearly independent from the minimal dimension of the shipment,
   to check whether the predetermined second length of the opening is equal to or greater than the determined second to minimal dimension of the shipment, to check whether a predetermined maximal first length of the opening is equal to or greater than the determined minimal dimension of the shipment when the predetermined second length of the opening is equal to or greater than the determined second to minimal dimension of the shipment, to set the first length of the opening equal to the determined minimal dimension of the shipment when the predetermined second length of the opening is equal to or greater than the determined minimal dimension of the shipment, to check whether the predetermined second length of the opening is equal to or greater than the determined minimal dimension of the shipment when the predetermined second length of the opening is not equal to or greater than the determined second to minimal dimension of the shipment, to check whether the predetermined maximal first length of the opening is equal to or greater than the determined second to minimal dimension of the shipment when the predetermined second length of the opening is equal to or greater than the determined minimal dimension of the shipment, and to set the first length of the opening equal to the determined second to minimal dimension when the predetermined maximal first length of the opening is equal to or greater than the determined second to minimal dimension of the shipment.

2. The system according to claim 1, wherein the dimensions of the shipment comprise a first main dimension, a second main dimension, and a third main dimension of a cuboid representing the shipment, and wherein the second main dimension is linearly independent from the first main dimension and the third main dimension is linearly independent from the first main dimension and from the second main dimension.

3. The system according to claim 2, wherein the cuboid is a virtual substitution for a real shape of the shipment, and wherein the cuboid completely surrounds the real shape of the shipment.

4. The system according to claim 1, wherein at least one of the dimensions of the shipment is extended by a predetermined tolerance or a tolerance of +/−10%.

5. The system according to claim 1, wherein the controller is further arranged and configured:
to determine a maximal dimension of the shipment; and
to check whether the loading space can receive the determined maximal dimension of the shipment through the opening, and
wherein the first element is moved by the calculated first length of the opening when the loading space can receive the determined maximal dimension of the shipment through the opening.

6. The system according to claim 1, wherein the controller is further arranged and configured to generate an error message when:
the predetermined maximal area of the opening is not sufficient for the shipment to be delivered into the loading space of the vehicle through the opening; and/or
the predetermined maximal first length of the opening is not equal to or greater than the determined minimal dimension of the shipment; and/or
the predetermined second length of the opening is not equal to or greater than the determined minimal dimension of the shipment; and/or
the predetermined maximal first length of the opening is not equal to or greater than the determined second to minimal dimension of the shipment.

7. The system according to claim 6, wherein the controller is arranged and configured:
to calculate a first length of a further opening based on the received dimensions and/or based on the determined dimensions of the shipment and further based on an area of the further opening configured to receive the shipment through the further opening in the loading space of a further loading space of the vehicle when:
the predetermined maximal area of a previous opening is not sufficient for the shipment to be delivered into the loading space of the vehicle through the opening; and/or
the predetermined maximal first length of the previous opening is not equal to or greater than the determined minimal dimension of the shipment; and/or
the predetermined second length of the previous opening is not equal to or greater than the determined minimal dimension of the shipment; and/or
the predetermined maximal first length of the previous opening is not equal to or greater than the determined second to minimal dimension of the shipment.

8. The system according to claim 7, wherein the controller is arranged and configured:
to send the generated error message to an external system when:
the predetermined maximal area of all openings is not sufficient for the shipment to be delivered into the loading space of the vehicle through the opening; and/or
the predetermined maximal first length of all openings is not equal to or greater than the determined minimal dimension of the shipment; and/or
the predetermined second length of all openings is not equal to or greater than the determined minimal dimension of the shipment; and/or
the predetermined maximal first length of all openings is not equal to or greater than the determined second to minimal dimension of the shipment.

9. The system according to claim 1, wherein:
the first element is a movable window of the vehicle, the second element is a door, a tailgate, or a body of the vehicle, and the actuator is arranged and configured to move the movable window relative to the door, the tailgate, or the body by the calculated first length of the opening in order to provide the opening; and/or
the first element is a movable tailgate of the vehicle, the second element is the body of the vehicle, and the actuator is arranged and configured to move the movable tailgate relative to the body by the calculated first length of the opening in order to provide the opening; and/or
the first element is a movable sunroof of the vehicle, the second element is the body of the vehicle, and the actuator is arranged and configured to move the movable sunroof relative to the body by the calculated first length of the opening in order to provide the opening; and/or
the first element is a movable door or a movable sliding door of the vehicle, the second element is the body of the vehicle, and the actuator is arranged and configured to move the movable door or the movable sliding door relative to the body by the calculated first length of the opening in order to provide the opening; and/or the first element is a movable convertible top of the vehicle, the second element is the body of the vehicle, and the actuator is arranged and configured to move the movable convertible top relative to the body by the calculated first length of the opening in order to provide the opening; and/or the first element is a movable lid of a top box of the vehicle, the second element is a bottom part of the top box, and the actuator is arranged and configured to move the movable lid of the top box relative to the bottom part of the top box by the calculated first length of the opening in order to provide the opening.

10. The system according to claim 1,
wherein the camera system has an image recognition functionality and is arranged and configured to recognize borders of the shipment and to derive the dimensions of the shipment based on the recognized borders, and wherein the laser scanner system is arranged and configured to measure the borders of the shipment and to derive the dimensions of the shipment based on the measured borders.

11. The system according to claim 1, further comprising a detection means communicatively connected with the controller and arranged and configured to detect the shipment in the loading space, wherein the controller is further arranged and configured to check whether the shipment is in the loading space, and wherein the actuator is further arranged and configured to move back the first element relative to the second element by the calculated first length of the opening in order to close the opening when the shipment is in the loading space.

12. The system according to claim 11, wherein the detection means comprises at least one of:
  a second camera system with an image recognition functionality arranged and configured to recognize the shipment inside the loading space; and
  a second receiver arranged and configured to receive a message from an external system acknowledging that the shipment was successfully delivered into the loading space.

13. The vehicle system according to claim 1, wherein
the first element is a movable window of the vehicle and the second element is a door, a tailgate, or a body of the vehicle; or
the first element is a movable tailgate of the vehicle and the second element is the body of the vehicle; or
the first element is a movable sunroof of the vehicle and the second element is the body of the vehicle; or
the first element is a movable door of the vehicle or a movable sliding door and the second element is the body of the vehicle; or
the first element is a movable convertible top of the vehicle and the second element is the body; or
the first element is a movable lid of a top box mounted to the vehicle and the second element is a bottom part of the top box.

14. A method of providing an opening for receiving a shipment in a loading space of a vehicle, the method comprising the steps:
  a1) receiving dimensions of the shipment; and/or
  a2) determining the dimensions of the shipment;
  b) calculating a first length of the opening based on the received dimensions and/or based on the determined dimensions of the shipment and further based on an area of the opening configured to receive the shipment through the opening in the loading space of the vehicle; and
  c) moving a first element of the vehicle relative to a second element of the vehicle by the calculated first length of the opening in order to provide the opening,
wherein the area comprises a predetermined second length of the opening, and wherein the predetermined second length of the opening is perpendicular to the first length of the opening, and
wherein the method further comprises the steps
  checking whether a predetermined maximal area of the opening is sufficient for the shipment to be delivered into the loading space of the vehicle through the opening based on the received dimensions and/or based on the determined dimensions of the shipment and based on the predetermined maximal area of the opening, wherein the first element is moved by the calculated first length of the opening when the predetermined maximal area of the opening is sufficient for the shipment to be delivered into the loading space of the vehicle through the opening,
  determining a minimal dimension of the shipment and to set the first length of the opening equal to the determined minimal dimension of the shipment,
  determining a second to minimal dimension of the shipment linearly independent from the minimal dimension of the shipment,
  checking whether the predetermined second length of the opening is equal to or greater than the determined second to minimal dimension of the shipment,
  checking whether a predetermined maximal first length of the opening is equal to or greater than the determined minimal dimension of the shipment when the predetermined second length of the opening is equal to or greater than the determined second to minimal dimension of the shipment,
  setting the first length of the opening equal to the determined minimal dimension of the shipment when the predetermined second length of the opening is equal to or greater than the determined minimal dimension of the shipment,
  checking whether the predetermined second length of the opening is equal to or greater than the determined minimal dimension of the shipment when the predetermined second length of the opening is not equal to or greater than the determined second to minimal dimension of the shipment,
  checking whether the predetermined maximal first length of the opening is equal to or greater than the determined second to minimal dimension of the shipment when the predetermined second length of the opening is equal to or greater than the determined minimal dimension of the shipment, and
  setting the first length of the opening equal to the determined second to minimal dimension when the predetermined maximal first length of the opening is equal to or greater than the determined second to minimal dimension of the shipment.

15. A method of delivering a shipment into a vehicle, the method comprising the steps:
  A) initiating delivering of the shipment into a loading space of the vehicle;
  B) delivering the shipment to a vicinity of the vehicle;
  C) providing an opening for delivering the shipment into the loading space of the vehicle;

D) checking whether the shipment was placed into the loading space of the vehicle via the provided opening; and E) closing the opening when the shipment was placed into the loading space of the vehicle, wherein providing the opening for delivering the shipment into the loading space of the vehicle comprises
- a1) receiving dimensions of the shipment, and/or
- a2) determining the dimensions of the shipment,
- b) calculating a first length of the opening based on the received dimensions and/or based on the determined dimensions of the shipment and further based on an area of the opening configured to receive the shipment through the opening in the loading space of the vehicle, and
- c) moving a first element of the vehicle relative to a second element of the vehicle by the calculated first length of the opening in order to provide the opening, wherein the area comprises a predetermined second length of the opening, and wherein the predetermined second length of the opening is perpendicular to the first length of the opening, and wherein providing the opening for delivering the shipment into the loading space of the vehicle further comprises
- checking whether a predetermined maximal area of the opening is sufficient for the shipment to be delivered into the loading space of the vehicle through the opening based on the received dimensions and/or based on the determined dimensions of the shipment and based on the predetermined maximal area of the opening, wherein the first element is moved by the calculated first length of the opening when the predetermined maximal area of the opening is sufficient for the shipment to be delivered into the loading space of the vehicle through the opening,
- determining a minimal dimension of the shipment and to set the first length of the opening equal to the determined minimal dimension of the shipment,
- determining a second to minimal dimension of the shipment linearly independent from the minimal dimension of the shipment,
- checking whether the predetermined second length of the opening is equal to or greater than the determined second to minimal dimension of the shipment,
- checking whether a predetermined maximal first length of the opening is equal to or greater than the determined minimal dimension of the shipment when the predetermined second length of the opening is equal to or greater than the determined second to minimal dimension of the shipment,
- setting the first length of the opening equal to the determined minimal dimension of the shipment when the predetermined second length of the opening is equal to or greater than the determined minimal dimension of the shipment,
- checking whether the predetermined second length of the opening is equal to or greater than the determined minimal dimension of the shipment when the predetermined second length of the opening is not equal to or greater than the determined second to minimal dimension of the shipment,
- checking whether the predetermined maximal first length of the opening is equal to or greater than the determined second to minimal dimension of the shipment when the predetermined second length of the opening is equal to or greater than the determined minimal dimension of the shipment, and
- setting the first length of the opening equal to the determined second to minimal dimension when the predetermined maximal first length of the opening is equal to or greater than the determined second to minimal dimension of the shipment.

* * * * *

UNITED STATES PATENT AND TRADEMARK OFFICE
CERTIFICATE OF CORRECTION

| | | |
|---|---|---|
| PATENT NO. | : 11,919,431 B2 | Page 1 of 1 |
| APPLICATION NO. | : 16/709595 | |
| DATED | : March 5, 2024 | |
| INVENTOR(S) | : Michael Schreiber and Ingmar Langer | |

It is certified that error appears in the above-identified patent and that said Letters Patent is hereby corrected as shown below:

In the Claims

Claim 13, Column 23, Line 44:
"The vehicle system according to claim 1, wherein"
Should be replaced with:
--The system according to claim 1, wherein--

Signed and Sealed this
Twenty-fifth Day of June, 2024

*Katherine Kelly Vidal*

Katherine Kelly Vidal
*Director of the United States Patent and Trademark Office*